Nov. 17, 1931.   A. F. G. GIORCHINO   1,832,017
UNITARY SECTIONAL TUBE AND VALVE THEREFOR
Filed Jan. 3, 1928   2 Sheets-Sheet 1
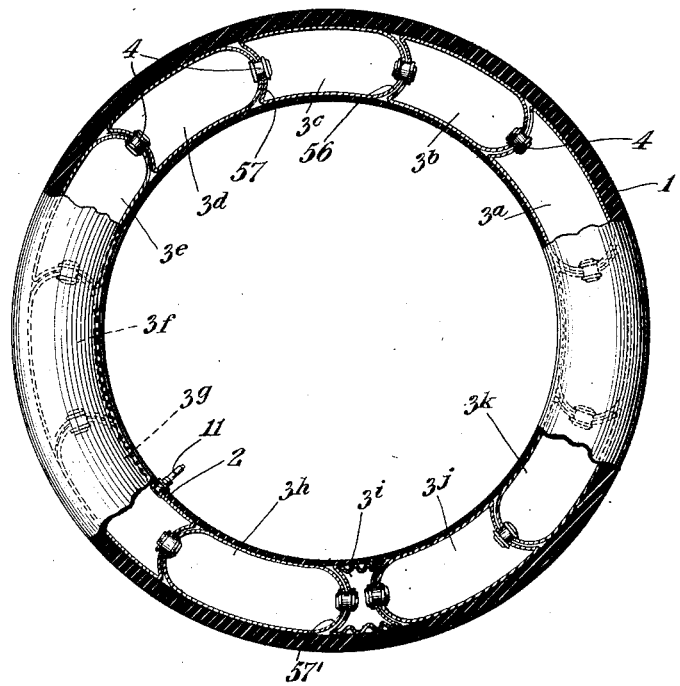
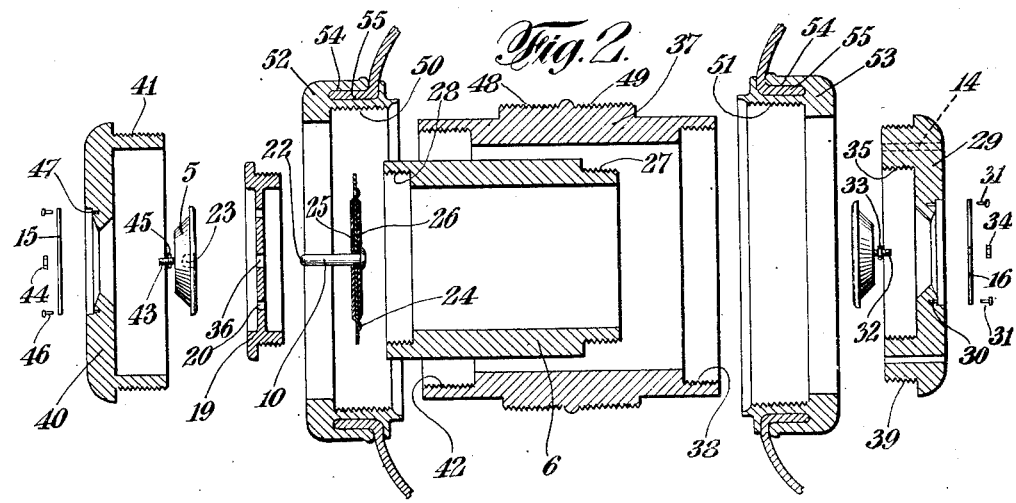
Inventor
Arturo F. G. Giorchino
By his Attorneys
Prindle, Wright, Neal & Bean

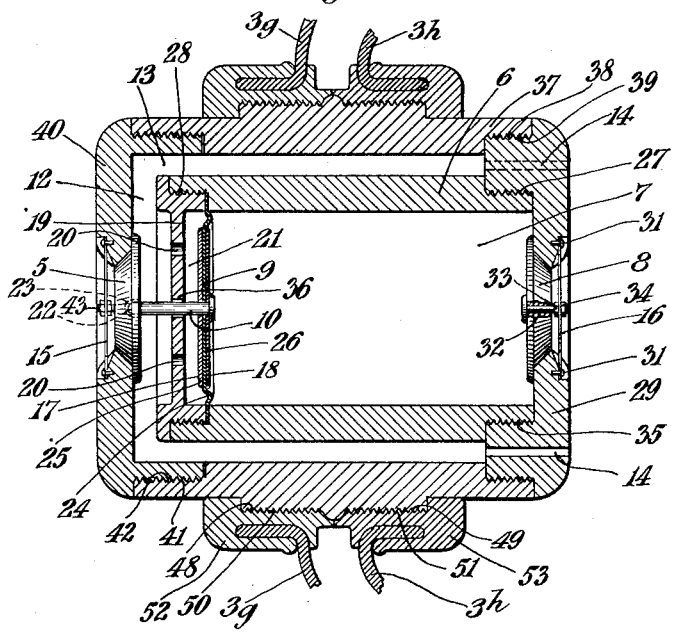
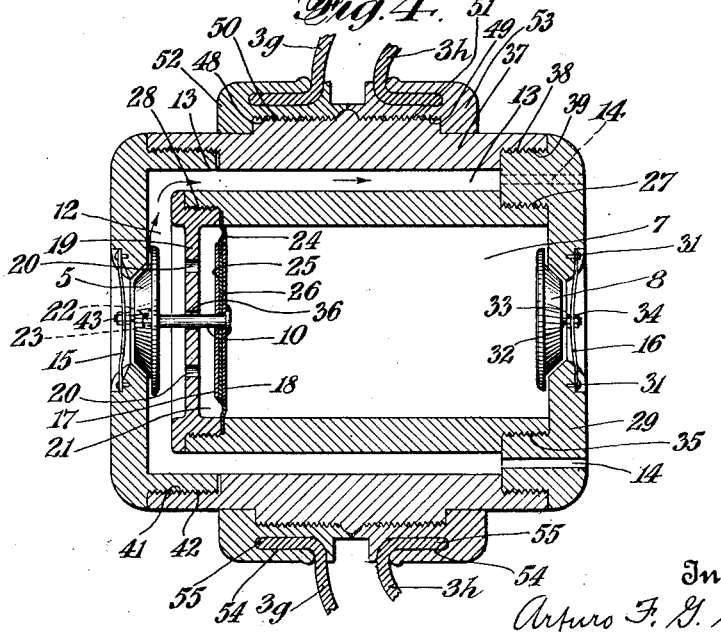

Patented Nov. 17, 1931

1,832,017

UNITED STATES PATENT OFFICE

ARTURO F. G. GIORCHINO, OF NEW YORK, N. Y.

UNITARY SECTIONAL TUBE AND VALVE THEREFOR

Application filed January 3, 1928. Serial No. 244,082.

This invention relates to a pneumatic inner tube for use in an outer casing, such as an automobile tire, and the general object of the invention is a tube so constructed that even though it is punctured, it will not become completely deflated and can still be used.

The usual inner tube consists of a single air container and consequently if it is punctured at any point, it becomes entirely deflated. From time to time suggestions have been made to divide the inner tube into sections, both transversely and longitudinally, but tubes made in accordance with these suggestions have not found favor with the public. I believe that the reasons for this are that the tubes have either been too complicated to be easily kept pumped up or they have been so fastened in place in the tire casing that even though one section is punctured the other sections cannot properly fill the space of the punctured section and the tire does not function properly.

My invention is designed to overcome the defects in the prior art sectional tubes and to provide a practical, conveniently inflatable tube so constructed that even though it is punctured it can be used and consequently there will be no necessity to immediately change the tire, should the tube be punctured, and the vehicle may proceed on its way without delay. Such a tube, from a practical standpoint, should be inflatable by a single valve just as is the usual tube and after any section of the tube is punctured, the other sections must fill up the space left by the collapse of the punctured section so that the tire contains no soft spots which would prevent it from running smoothly; furthermore, there must be automatically operating valves between the sections of the tube so that as soon as any section collapses due to a puncture, the valves prevent the escape of air from the inflated sections into the deflated section, but these valves must also permit the inflation of the several sections from the single main valve through which the usual automobile is inflated until the puncture and deflation of any section occurs.

Some of the objects and features of my invention, therefore, are more specifically; a sectional tube in which one section may be deflated by a puncture but the other sections will remain inflated; a sectional tube in which all of the sections may be inflated from a single valve adapted to be connected to a source of air pressure; a sectional tube in which each section may be inflated through an adjoining section; a tube which, although composed of sections, has each section free from connection with the tire rim, with the exception of the one section through which all of the sections are inflated, so that the tube is, for inflation purposes, a single tube and the sections may move to fill the space left by a punctured or deflated section; a tube section to be used as a part of a sectional tube and of a shape adapted to fill the space left by a punctured or deflated or collapsed section; a valve construction for joining adjacent sections and constructed to permit each section to be inflated through an adjoining section, but to automatically prevent the air from any inflated section to leak into a punctured or deflated section; a valve joining adjacent sections and constructed to permit air pressure in the sections to be equalized but to automatically prevent the passage of air from an inflated section to a punctured or deflated section.

Other objects and features of the invention will more fully appear from the following description and the following drawings and will be particularly pointed out in the claims.

The drawings illustrate both in elevation and section a preferred form of construction of the tube and valve which I have invented and embody the broad principles of the invention.

In the drawings,

Fig. 1 illustrates a tire on a rim and shows the positions of the valve constructions and the positions which the sections of the tube may take before and after one of the sections is punctured.

Fig. 2 is a section through one of the valve constructions showing the parts separated but approximately in their relative positions ready for assembling.

Fig. 3 is a section through one of the assembled valve constructions showing the positions of the parts as they are after the tube has been inflated and is being used.

Fig. 4 is a section through one of the valve constructions showing the positions of the parts while the tube is being inflated.

Only such parts of the tube and valve constructions are shown on the drawings as are necessary to illustrate the invention and its operation.

As illustrated herein a tire 1 of any usual construction is mounted on a rim 2 which likewise may be of any usual construction and the sectional tube, denoted generally at 3, is within the tire. For purposes of explanation the sections of the tube are designated 3a, b, c, d, e, f, g, h, i, j and k and although only a certain number of the sections are shown, it is to be understood that any suitable number may be used and they may be of any desired size or proportion as the maker may wish or as may be necessary to fill tire casings of different sizes. Also, although the sections illustrated herein have concave and convex ends for reasons later to be described, any suitable configuration may be used. The sections of the tubes are connected by the valve constructions 4 which permit the passage of the air from an inflated section, such as 3g, to an inflated section such as 3h and so on, until all of the sections are inflated, but which thereafter normally prevent the passage of the air from any inflated section such as 3h or 3j into a punctured or deflated section such as 3i.

The valve constructions and their operation will now be explained and for this purpose the valve construction between the tube sections 3g and 3h may be considered. Although the operation of the valve constructions will be explained in connection with the tube sections which are filled with air, it is to be understood that the tube sections are symbolic of any containers and the air is likewise symbolic of any elastic fluid or gas which can be compressed.

The essential parts of a valve construction are a main valve 5 shown herein as a one way valve, for permitting the passage of the elastic fluid, which in the case of a tire is almost invariably air, from the first tube section or other container 3g into the second tube section or container 3h; the air chamber 6 having one valved part 7 adapted to hold air under pressure; the air chamber inlet valve 8; and the movable portion in the air chamber, illustrated herein as a diaphragm 9 with the connection, shown as a pin 10, between the diaphragm and the main valve 5.

Now assume that the tube has just been inserted in the tire casing and is being filled with air for the first time. As the tube section 3g is inflated slightly through the usual inflating valve 11, the valve 5 is forced open, as is illustrated in Fig. 4, and the air passes through the valve 5 and through passages 12, 13 and 14 into the tube section 3h. As the tube section 3h becomes filled with air, the air chamber inlet valve 8 is forced open and the valved part 7 of the air chamber becomes filled with air which passes from the tube section 3h through the inlet valve 8 into the chamber. As soon as the tube section 3h becomes inflated to such a pressure that the valve 5 of the next valve construction is pressed open, the next tube section will be inflated and so on, the air passing from section 3g through section 3h and through each succeeding section until all of the sections are inflated. The valves 5 and 8 work against springs 15 and 16 respectively which, preferably, serve only to hold the valves seated with a light pressure so that the air in the tube sections 3g, 3h and in the chamber 6 is at substantially the same pressure.

After all of the sections of the tube have been inflated and all of the closed pressure parts 7 of the air chambers 6 filled with air, the parts of the valve construction are at rest in the position shown in Fig. 3. If it be supposed that the tube is inflated to a pressure of 30 lbs., the pressure in the tube sections 3g and 3h and in the pressure parts 7 of the air chambers will be substantially 30 lbs. and therefore the air pressure on the faces 17 and 18 of the diaphragm 9 will be equal and the diaphragm will be at rest in the position illustrated in Fig. 3. The air pressure on face 17 of the diaphragm is the same as the pressure in the tube section 3h and in the pressure part 7 of the air chamber 6 because the end plate 19 of the air chamber is provided with orifices 20 so that the end 21 of the air chamber nearest the main valve 5, is unvalved, and the air in the tube section 3h may freely pass through the passages 12, 13, 14 and the orifices 20 to maintain pressure on the face 17 of the diaphragm.

Now let it be supposed that the tube section 3g is punctured and the air leaks out but the section 3h is not punctured. The valve 5 will remain closed and, as the air pressure in the tube section 3g falls, the valve 5 will be pressed more tightly into its seat due to the fact that there is only a slight pressure in section 3g and a high pressure in section 3h. Thus, no air can pass from section 3h into section 3g.

Now suppose that section 3h is punctured and the pressure in it begins to drop, but section 3g is not punctured. When the pressure begins to drop there is a decrease of pressure on the face 17 of the diaphragm 9 and the air in the closed end 7 of the air chamber, which is at full 30 lbs. pressure and cannot escape because it is trapped by the diaphragm 9 and the valve 8, immediately causes the diaphragm to move toward the valve 5. The pin 10 contacts with the valve 5 and holds it closed. As the air pressure in the tube section 3$h$ falls to zero, the air in the tube section 3$g$ tends to force the valve 5 open, but it is held closed by the air in the pressure part 7 of the air chamber acting through the diaphragm 9 and pin 10 and, since the diaphragm is purposely made of an area greater than the area of the valve 5, the force holding the valve 5 closed is greater than the force tending to open it, and therefore the valve will remain closed. It may here be stated that the diaphragm is purposely placed near the orificed end of the air chamber to provide as large a pressure part 7 as is possible so that a relatively large body of air is held under pressure. This enables the diaphragm 9 to move to hold the valve 5 closed when section 3$h$ is punctured without substantially decreasing the pressure in the pressure part 7 of the air chamber. Thus air is prevented from passing from the tube section 3$g$ into the punctured section 3$h$. It will thus be seen that the valve construction permits the passage of the air between the two sections under normal conditions such as obtain when the tube is being inflated, i. e., when one section, for instance section 3$g$, is filled with fluid under a slight pressure and the other section, for instance section 3$h$, is not filled with fluid under pressure and the valve construction also prevents the passage of the air from one section into the other when the pressure in either of the sections falls, as it does when either of the sections is punctured and deflated, and the valve 5 permits the passage of the air from the first section 3$g$, into the second section, 3$h$, but prevents the passage of the air from the second section 3$h$, into the first section 3$g$ and the diaphragm 9 with the pin 10 constitute means to hold the valve 5 closed to prevent the passage of the air from the first section, 3$g$, into the second section 3$h$, when the air pressure in the second section 3$h$ falls after having once been built up.

As the tire and tube rotate any slight differences in air pressure in the several tube sections are decreased until the pressures in all of tube sections are equal. This is brought about by the fact that when a vehicle is driven and the tire and tube rotate as the tube sections reach their lowest position, in which the air in the lowest section supports one-quarter of the weight of the vehicle, the tube section is distorted in such a way as to compress the air in it. The increase in pressure is very slight, but it causes the valve 5 to open, thus causing a little of the air in the distorted section to flow into the next section which is not at that time distorted. This goes on until an equilibrium is reached with the air in all of the sections at substantially the same pressure. In order to permit the valve 5 to move slightly for this purpose so long as the pressures on the faces 17 and 18 of the diaphragm are substantially equal, the end 22 of the pin 10 does not contact with the valve 5 when the parts are in their normal position shown in Fig. 3. Preferably the top of the valve 5 is provided with a recess 23 of such a depth that the end 22 of the pin does not contact with the valve 5 when the parts are in the position shown in Fig. 3, although the sides of the recess surround the end 22 of the pin for a mutual guiding action, the pin guiding the valve into its proper seat and the valve, when properly seated, guiding the end of the pin when the pin moves to close the valve, as it does when section 3$h$ is punctured. Thus the valve 5 and the diaphragm 9 have a slight free movement to permit equalization of air pressures, but the tension of spring 15 and the clearance between the end 22 of the pin and the valve 5 are so proportioned that the pin and diaphragm function properly to hold the valve 5 shut when the section 3$h$ is punctured.

It is well known that air in the usual tube gradually leaks out due to the porosity of the rubber from which the tube is made and the tire becomes "soft". The same thing happens in the tube sections illustrated herein because they are intended to be made of rubber as are the usual tubes. As the air slowly leaks from the tube sections the air also slowly leaks from the pressure part 7 of the air chamber either through the valve 8 or through the flexible material 24 which connects the face plates 25 and 26 to the walls of the air chamber and with them forms the complete diaphragm heretofore designated generally by the numeral 9. Thus the air pressure in the pressure part 7 of the air chamber will normally be substantially the same as the air pressure in the section 3$h$. Therefore, when the entire tube becomes "soft" and it is necessary to inflate it again, the inflation takes place just as it did when the tube was originally inflated, that is, the air pressure in the pressure part 7 of the air chamber does not hold the valve 5 tightly closed so that the tube can be inflated only once. It is to be understood however, that, although it is here stated that the air leaks from the pressure part 7 of the air chamber, this leakage is extremely slow, extending over several weeks and the leakage is not so rapid as to prevent the air in the pressure part 7 of the air chamber from performing its function of moving the diaphragm 9 to hold the valve 5 shut when the section 3$h$ is punctured nor to keep the valve closed.

The details of the valve construction are evident from an inspection of Figs. 2, 3 and 4 of the drawings which illustrate one form of the valve construction. The mid section of the air chamber 6 may be made of tubular metal threaded at its ends at 27 and 28 to receive the valved end plate 29 and the unvalved end plate 19 respectively. The valved end plate 29 is fashioned so as to provide a seat for the valve 8 and has the air passages 14 through it so that the air may pass from one tube section to another as previously described. The valved end plate may also be provided with screw threaded recesses 30 to receive the screws 31 which hold the spring 16 in place. The screws 31 are not necessary however, because the valve 8 holds the spring 16 in place rather securely by means of a threaded rod 32 and the nuts 33 and 34. The nuts 33 and 34 permit the valve 8 readily to be put in place and also permit the tension of the spring 16 to be adjusted. Screw threads 35 on the valved end plate 29 mate with the screw threads 27 on the mid section 6 of the air chamber and serve to hold the parts of the air chamber in their proper positions. The unvalved end plate 19 of the air chamber is provided with the orifices 20 hereinbefore described and the guiding orifice 36 which guides the pin 10. Screw threads 28 on the end of the air chamber hold the unvalved end plate 19 of the air chamber in position and enable the diaphragm 9 easily to be held in or removed from its position. The face plates 25 and 26 serve to support and strengthen the flexible material 24 from which the diaphragm is made. These face plates may be made of any suitable material such as metal, hard rubber, etc. The shell 37 of the valve construction is fastened to the valved end plate 29 of the air chamber by mating threads 38 and 39 on said shell and valved end plate respectively. The end 40 of the valve construction which supports the valve 5 is fastened to the shell 37 by means of mating threads 41 and 42 on the end and shell respectively. This end 40 of the valve construction is so formed as to provide a seat for the valve 5. The valve 5 is preferably held in position by the spring 15, threaded rod 43, nuts 44 and 45 and screws 46 which fit into threaded recesses 47 as hereinbefore described in connection with valve 8.

The valve constructions may be fastened to the tube sections in any suitable manner, but preferably in such a manner that the entire valve construction may be removed from its place between the two tube sections in order that any valve construction may easily and quickly be removed and replaced by a new one and yet not disturb the walls of the tube sections which are adjacent to the valve constructions. For this purpose the outside of the shell 37 of the valve construction may be provided with threads 48 and 49 which mate with threads 50 and 51 respectively on connecting rings 52 and 53. The connecting rings may be provided with recesses 54 which receive the end portions 55 of the tube sections. The end portions 55 of the tube sections may be and preferably are permanently fastened, for instance by cement, in the recesses 54 on the connecting rings when the tube sections are made. Thus, when a purchaser buys a tube section to replace a punctured one, a properly threaded ring 52 is in one end of the tube section and another properly threaded ring 53 is in the other end of the tube section. By merely unscrewing the rings 52 and 53 any valve construction or tube section may be removed and replaced.

As heretofore noted, the tube sections preferably have concave and convex ends so that the space left by the collapse of any tube section may quickly be filled. Thus, each tube section has a convex end 56 and an end 57 which is concave when all of the tube sections are inflated and in their normal position, in which position the convex and concave ends of any section are adapted to fit the cooperating ends of the adjacent sections. When any tube section, such as 3i, collapses, the concave end 57' of the adjacent tube section corresponding to tube section 3h bulges out and becomes a convex end. This, to a large extent, fills in the space left by the collapse of the tube section 3i and the normally concaved end of the tube section 3h remains in this position until the other tube sections gradually work around to fill up the space left by the collapse of the section 3i. One of the advantages which my sectional tube has over previous sectional tubes is, that all of the tube sections of my tube, except the one section which has the inflating valve 11, are unconnected to the rim 2 of the wheel and are therefore free to move within the tire casing, so that they may change their positions within the casing to fill the space left by the collapse or deflation of any section. Thus, when any tube section, such as 3i, is punctured and collapses the concave end of the adjacent tube section such as 3h, partially fills in the space and tube section 3j expands somewhat to help fill up the space and the other tube sections expand slightly and work around until the space normally occupied by the punctured section is completely filled in. The tire casing is slightly softer than normal, but it may be used for a considerable period after any tube section is punctured and there is no necessity of immediately stopping the vehicle and changing the tire or tube after a puncture. Furthermore, it is only necessary to replace the single punctured section instead of the entire tube, when repairs are finally made.

As many modifications of my invention may be made, particularly in the form and construction thereof. I desire it to be understood that my invention is to be construed as broadly as the claims taken in conjunction with the prior art, may allow.

I claim:

1. In a composite inner tube adapted for use in a tire casing and composed of separate sections, the combination with said tube of valve constructions joining the sections, each of said valve constructions comprising a one-way valve permitting passage of air from a section of high pressure to a section of lower pressure, an air chamber adapted to hold air under pressure to close said one-way valve when air pressure is built up in said chamber and an air chamber valve to permit air pressure to be built up in said chamber.

2. A valve construction for permitting the passage of an elastic fluid between two fluid containers when one container is filled with fluid under pressure and the other is not and for preventing the passage of the fluid from one container into the other container when the fluid pressure in said other container falls, said valve construction including a valve permitting passage of the fluid from the first container into the second container but preventing the passage of the fluid from the second container into the first container, and means operable by the fluid pressure to hold said valve closed to prevent passage of the fluid from the first container into the second container when the fluid pressure in the second container falls after having once been built up in the second container.

3. A valve construction for permitting the passage of an elastic fluid between two fluid containers when one container is filled with fluid under pressure and the other is not and for preventing the passage of the fluid from one container into the other container when the fluid pressure in said other container falls, said valve construction including a valve permitting the passage of the fluid from the first container into the second container but preventing the passage of the fluid from the second container to the first container and means operable by the fluid pressure in the second container to hold said valve closed to prevent passage of the fluid from the first container into the second container when the fluid pressure in the second container falls after having once been built up in the second container.

4. A valve construction for permitting the passage of an elastic fluid between two fluid containers when one container is filled with fluid under pressure and the other is not and for preventing the passage of the fluid from one container into the other container when the fluid pressure in said other container falls, said valve construction including a valve permitting passage of the fluid from the first container into the second container but preventing the passage of the fluid from the second container into the first container and means operable by a decrease of the fluid pressure in the second container to hold said valve closed to prevent passage of the fluid from the first container into the second container when the fluid pressure in the second container falls after having once been built up in the second container.

5. A valve construction for permitting the passage of an elastic fluid between two fluid containers when one container is filled with fluid under pressure and the other is not and for preventing the passage of the fluid from one container into the other container when the fluid pressure in said other container falls, said valve construction including a main valve permitting passage of the fluid from the first container into the second container but preventing passage of the fluid from the second container into the first container, and mechanism to hold said main valve closed when the fluid pressure in the second container decreases after having once been built up, said mechanism including a chamber, a movable partition in said chamber, a one-way inlet valve permitting the space within said chamber on one side of said movable partition to be filled with the fluid, the space within said chamber on the other side of said movable partition being unvalved, and a connection between said movable partition and said main valve.

6. A valve construction for permitting the passage of an elastic fluid between two fluid containers when one container is filled with fluid under pressure and the other is not and for preventing the passage of the fluid from one container into the other container when the fluid pressure in said other container falls, said valve construction including a main valve permitting passage of the fluid from the first container into the second container but preventing passage of the fluid from the second container into the first container, and mechanism to hold said main valve closed when the fluid pressure in the second container decreases after having once been built up, said mechanism including a chamber, a movable partition in said chamber, a one-way inlet valve permitting the space within said chamber on one side of said movable partition to be filled with the fluid from said second container and the space within said chamber on the other side of said movable partition being subject to changes of pressure of the fluid within the second container and a connection between said movable partition and said main valve.

7. A valve construction for permitting the passage of an elastic fluid between two fluid containers when one container is filled with fluid under pressure and the other is not and for preventing the passage of the fluid from one container into the other container when the fluid pressure in said other container falls, said valve construction including a main valve permitting passage of the fluid from the first container into the second container but preventing passage of the fluid from the second container into the first container, and mechanism to hold said main valve closed when the fluid pressure in the second container decreases after having once been built up, said mechanism including a chamber, a movable diaphragm within said chamber dividing the chamber into two parts, a one-way inlet valve closing one part of the chamber and permitting said closed part to be filled with the fluid from the second container at substantially the pressure within the second container but preventing the fluid within said closed part from passing back into the second container, a permanently opened passage connecting the other part of said chamber to the second container, and a connection between the movable diaphragm and the main valve, said mechanism and connection being so placed with regard to the main valve that when the pressure in the second container decreases the fluid within the closed part of said chamber causes the diaphragm to move to hold the main valve closed.

In testimony that I claim the foregoing, I have hereunto set my hard this 30th day of December, 1927.

ARTURO F. G. GIORCHINO.